US009718481B2

(12) United States Patent
Sano et al.

(10) Patent No.: US 9,718,481 B2
(45) Date of Patent: Aug. 1, 2017

(54) RAILCAR

(75) Inventors: Atsushi Sano, Kakogawa (JP); Naoaki Kawakami, Kobe (JP); Yasufumi Minamimoto, Kobe (JP); Naohiro Yoshida, Kobe (JP)

(73) Assignee: KAWASAKI JUKOGYO KABUSHIKI KAISHA, Kobe-shi (JP)

(*) Notice: Subject to any disclaimer, the term of this patent is extended or adjusted under 35 U.S.C. 154(b) by 187 days.

(21) Appl. No.: 14/414,279

(22) PCT Filed: Jul. 12, 2012

(86) PCT No.: PCT/JP2012/004518
§ 371 (c)(1),
(2), (4) Date: Feb. 13, 2015

(87) PCT Pub. No.: WO2014/010001
PCT Pub. Date: Jan. 16, 2014

(65) Prior Publication Data
US 2015/0203129 A1 Jul. 23, 2015

(51) Int. Cl.
*B61D 15/06* (2006.01)
*B61D 17/06* (2006.01)
(Continued)

(52) U.S. Cl.
CPC .......... *B61D 15/06* (2013.01); *B61D 17/04* (2013.01); *B61D 17/06* (2013.01); *B61D 17/08* (2013.01); *Y02T 30/34* (2013.01)

(58) Field of Classification Search
CPC ........ B61D 15/06; B61D 17/04; B61D 17/06; B61D 17/08; B61D 17/22; B61F 1/10; B61F 19/04; B61C 17/04
(Continued)

(56) References Cited

U.S. PATENT DOCUMENTS 409,002 A * 8/1889 Barnes .................. B61D 17/08
105/409
2,065,920 A * 12/1936 Clark ........................ E04B 2/72
52/275
(Continued)

FOREIGN PATENT DOCUMENTS

CN 102066179 A 5/2011
EP 581 707 * 2/1994
(Continued)

OTHER PUBLICATIONS

Search Report issued in International Application No. PCT/JP2012/004518 mailed Oct. 16, 2012.
(Continued)

*Primary Examiner* — Mark Le
(74) *Attorney, Agent, or Firm* — Oliff PLC

(57) ABSTRACT

A railcar includes: an underframe including an end beam at its railcar-longitudinal-direction end portion; side bodyshells; a roof bodyshell; side outside plates respectively arranged at both railcar-width-direction end portions of the railcar and constituting the side bodyshells; corner posts extending from the end beam toward the roof bodyshell; and intermediate coupling members each configured to couple the side outside plate and the corner post, the stiffness of the intermediate coupling member in a railcar longitudinal direction being lower than the stiffness of the intermediate coupling member in a vertical direction.

13 Claims, 7 Drawing Sheets

(51) Int. Cl.
*B61D 17/08* (2006.01)
*B61D 17/04* (2006.01)

(58) Field of Classification Search
USPC .............. 105/8.1, 392.5, 404, 401, 409, 410
See application file for complete search history.

(56) References Cited

U.S. PATENT DOCUMENTS

| | | | | |
|---|---|---|---|---|
| 3,151,574 | A | * | 10/1964 | Dean ...................... B61D 17/06 |
| | | | | 105/402 |
| 3,319,585 | A | * | 5/1967 | Pulcrano ................ B61D 17/08 |
| | | | | 105/401 |
| 3,819,466 | A | * | 6/1974 | Winfield ............... E04C 2/3405 |
| | | | | 428/175 |
| 5,791,118 | A | * | 8/1998 | Jordan ...................... B32B 3/28 |
| | | | | 428/184 |
| 8,512,498 | B2 | * | 8/2013 | Belanger ................... B32B 3/28 |
| | | | | 156/196 |
| 2003/0056684 | A1 | | 3/2003 | Nakamura et al. |
| 2012/0199043 | A1 | | 8/2012 | Matsuoka et al. |

FOREIGN PATENT DOCUMENTS

| | | |
|---|---|---|
| JP | 2003-095090 A | 4/2003 |
| JP | 2003-276596 A | 10/2003 |
| JP | 2010-018109 A | 1/2010 |
| JP | 2011-235730 A | 11/2011 |
| WO | 2011/021323 A1 | 2/2011 |

OTHER PUBLICATIONS

Jun. 23, 2015 Office Action issued in Chinese Patent Application No. 201280027236.3.

* cited by examiner

9,718,481 B2

RAILCAR

TECHNICAL FIELD

The present invention relates to a railcar including corner posts configured to absorb an impact load generated by crash.

BACKGROUND ART

Corner posts arranged at four corners of a railcar need to have high strength so as to be able to protect the inside of the railcar from crash. For example, PTL 1 discloses a railcar including corner post reinforcing members (58) provided at positions corresponding to corner posts (53).

CITATION LIST

Patent Literature

PTL 1: Japanese Laid-Open Patent Application Publication No. 2011-235730

SUMMARY OF INVENTION

Technical Problem

As above, it is most important that the corner posts are strong. In addition, it is desirable that the corner posts absorb an impact load generated when the railcar crashes. The impact load can be absorbed by the deformation of the corner posts (crash energy can be converted into deformation energy). However, if the corner posts deform, side outside plates coupled to the corner posts also deform. If the side outside plates deform significantly, the interior space is compressed, which is not preferable. Another problem is that an extensive repair work is required after the crash.

The present invention was made in consideration of the above circumstances, and an object of the present invention is to provide a railcar capable of preventing the deformation of the side outside plates even if the corner posts have deformed by the crash.

Solution to Problem

A railcar according to an embodiment of the present invention includes: an underframe including an end beam at a railcar-longitudinal-direction end portion thereof; side bodyshells; a roof bodyshell; side outside plates respectively arranged at both railcar-width-direction end portions of the railcar and constituting the side bodyshells; corner posts extending from the end beam toward the roof bodyshell; and intermediate coupling members each configured to couple the side outside plate and the corner post, stiffness of the intermediate coupling member in a railcar longitudinal direction being lower than stiffness of the intermediate coupling member in a vertical direction.

According to the above configuration, even if the railcar crashes, and the corner post deform, the displacement of the corner post is absorbed by the deformation of the intermediate coupling member located between the side outside plate and the corner post. Thus, the deformation of the side outside plate can be suppressed. In addition, the stiffness of the intermediate coupling member in the railcar longitudinal direction is lower than the stiffness thereof in the vertical direction. To be specific, the stiffness of the intermediate coupling member in the vertical direction can be made high, so that the intermediate coupling member can surely support the roof bodyshell via the side outside plate.

Advantageous Effects of Invention

As above, according to the present invention, even if the corner post deforms by crash, the deformation of the side outside plate can be suppressed.

DESCRIPTION OF EMBODIMENTS

Hereinafter, embodiments according to the present invention will be explained in reference to the drawings. In the following explanation and drawings, the same reference signs are used for the same or corresponding components, and a repetition of the same explanation is avoided.

Embodiment 1

Figure 1:
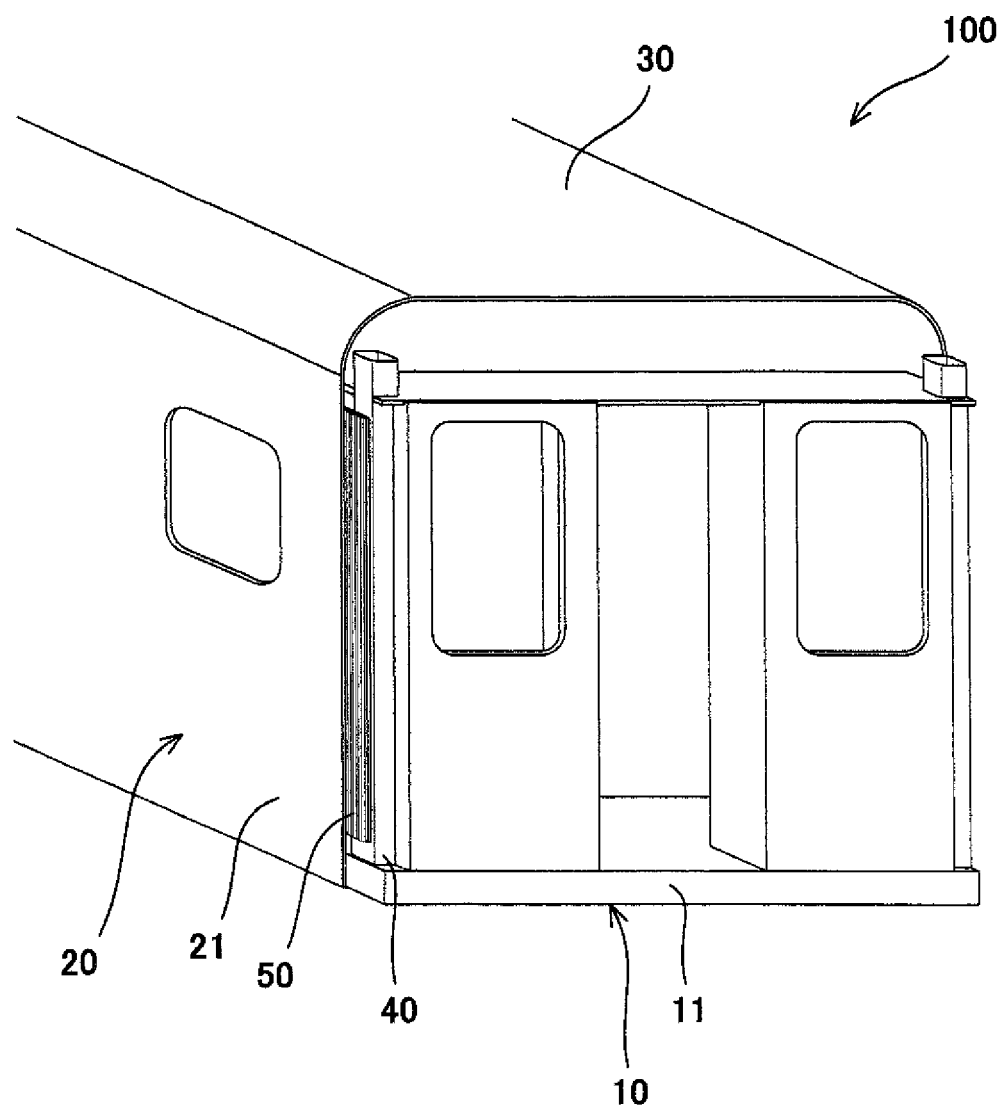
FIG. 1 is a perspective view of a railcar according to Embodiment 1 of the present invention.

First, a railcar 100 according to Embodiment 1 of the present invention will be explained in reference to FIGS. 1 to 6. FIG. 1 is a perspective view of the railcar 100 according to the present embodiment and a diagram showing a state where an end outside plate is detached. As shown in FIG. 1, the railcar 100 according to the present embodiment includes, as basic components, an underframe 10, side bodyshells 20, and a roof bodyshell 30. The underframe 10 includes an end beam 11 provided at a railcar-longitudinal-direction end portion. In terms of the vicinities of the four corners, the railcar 100 includes side outside plates 21, corner posts 40, and intermediate coupling members 50. Hereinafter, the side outside plates 21, the corner posts 40, and the intermediate coupling members 50 will be mainly explained.

Figure 2:
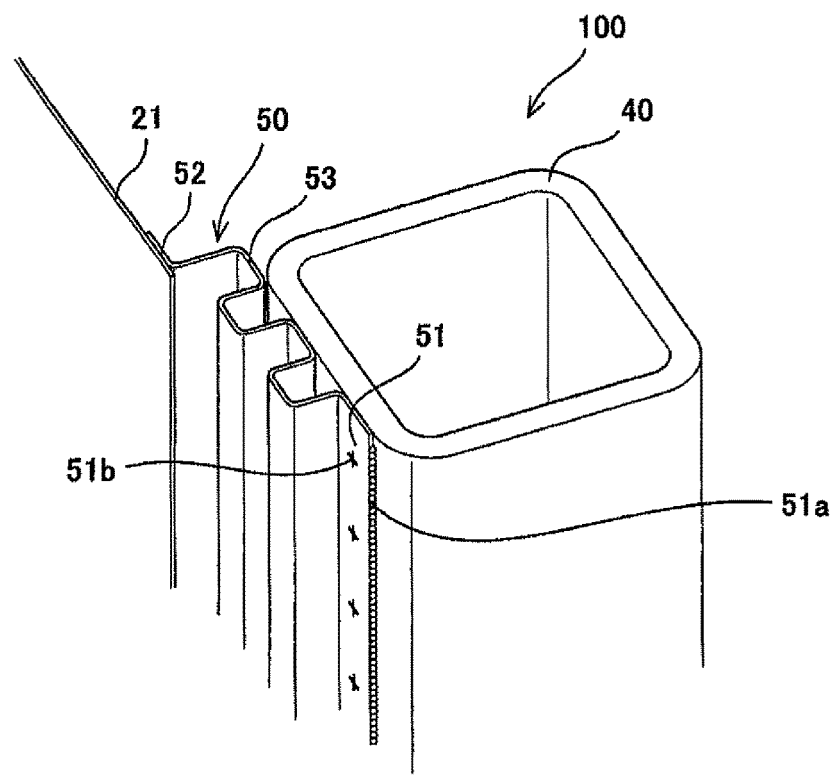
FIG. 2 is a cutaway perspective view of the vicinity of a corner post shown in FIG. 1.

The side outside plates 21 are members respectively arranged at both railcar-width-direction end portions of the railcar 100. Here, FIG. 2 is a cutaway perspective view of the vicinity of the corner post 40 of the railcar 100 according to the present embodiment. A right lower side in FIG. 2 corresponds to a longitudinal-direction end surface side (end panel side) of the railcar 100, a left side in FIG. 2 corresponds to a railcar-width-direction outer side, and a right side in FIG. 2 corresponds to is a railcar-width-direction inner side (passenger room side) (the same is true in FIGS. 3 and 4). In the following explanation, for convenience sake, the right lower side in FIG. 2 is referred to as a "front side", and a left upper side in FIG. 2 is referred to as a "rear side". As shown in FIG. 2, the side outside plate 21 is located outermost in the railcar width direction in the railcar 100. The side outside plate 21 and a frame (not shown) located on a railcar-width-direction inner side of the side outside plate 21 constitute the side bodyshell 20.

The corner posts 40 are members extending from the end beam 11 of the underframe 10 toward the roof bodyshell 30 (see FIG. 1). The corner posts 40 including the corner posts 40 not shown are respectively arranged at the four corners of the railcar 100. The shape of the corner post 40 is not especially limited, but the corner post 40 of the present embodiment is formed in a tubular shape having a rectangular frame-shaped cross section. The material, shape, and size of the corner post 40 differ depending on the required strength and the like (countries where the railcar is used, circumstances where the railcar is used, and purposes of using the railcar). An appropriate material, shape, and size of the corner post 40 of the present embodiment are selected such that when the railcar 100 crashes under a predetermined condition, the corner post 40 deforms to absorb a certain impact load.

The intermediate coupling members 50 are members each configured to couple the side outside plate 21 with the corner post 40. The intermediate coupling member 50 of the present embodiment extends in a vertical direction along the corner post 40 (see FIG. 1) and is formed by one plate member. As shown in FIG. 2, the intermediate coupling member 50 includes a corner post fixing portion 51 fixed to the corner post 40, a side outside plate fixing portion 52 fixed to the side outside plate 21, and a contracting portion 53 located between the corner post fixing portion 51 and the side outside plate fixing portion 52. The corner post fixing portion 51 is located at a front portion (one end) of the intermediate coupling member 50, and the side outside plate 21 is located at a rear portion (the other end) of the intermediate coupling member 50. The contracting portion 53 is formed in a so-called corrugated plate shape (rectangular wave shape). To be specific, the contracting portion 53 of the present embodiment has such a shape that one plate member is bend at a right angle plural times in a cross-sectional view. In the present embodiment, two grooves extending in the vertical direction are formed on the intermediate coupling member 50 (when viewed from each of railcar-width-direction outer and inner sides). However, the intermediate coupling member 50 may be formed to have one groove.

Figure 3:
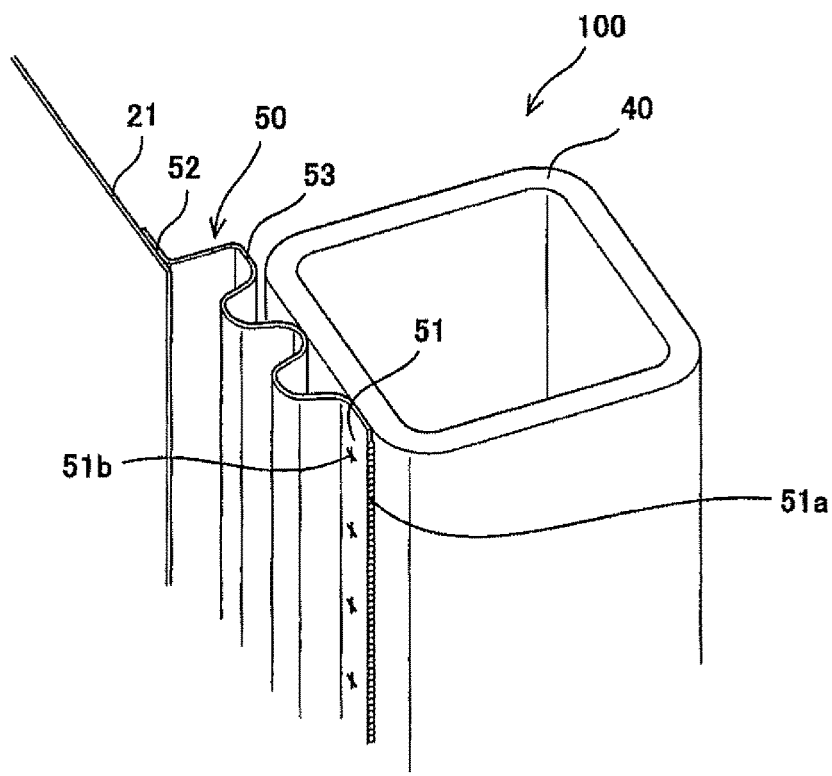
FIG. 3 shows a modification example of FIG. 2.
Figure 4:
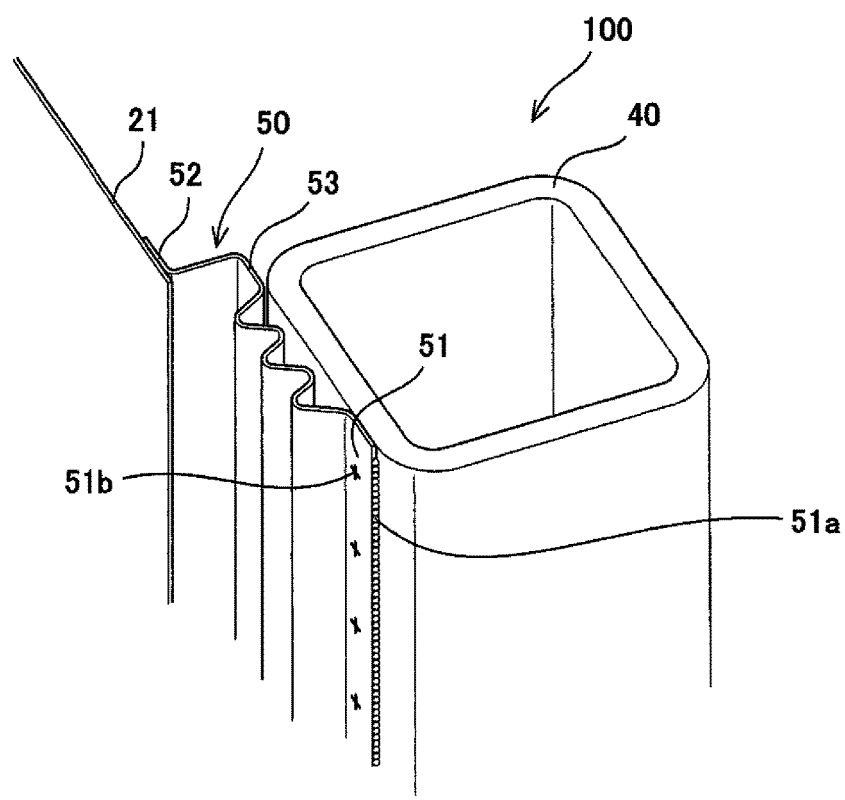
FIG. 4 shows another modification example of FIG. 2.

Here, FIGS. 3 and 4 are cutaway perspective views each showing the vicinity of the corner post 40 of the railcar 100 according to a modification example of the present embodiment. In FIG. 2, the contracting portion 53 of the intermediate coupling member 50 is formed in a corrugated plate shape. However, the contracting portion 53 may be formed as shown in, for example, FIG. 3 or 4. To be specific, as shown in FIG. 3, the contracting portion 53 of the intermediate coupling member 50 may be formed in a wave plate shape in such a manner that plate member is bent in an S shape plural times. In addition, as shown in FIG. 4, the contracting portion 53 of the intermediate coupling member 50 may be formed in such a manner that a plate member is bent in a V shape plural times. Two grooves extending in the vertical direction are formed on the intermediate coupling member 50 shown in FIG. 3, and three grooves extending in the vertical direction are formed on the intermediate coupling member 50 shown in FIG. 4.

Since the intermediate coupling member 50 is configured as above, the stiffness thereof in the railcar longitudinal direction is lower than the stiffness thereof in the vertical direction. Specifically, since the intermediate coupling member 50 needs to support the roof bodyshell 30 via the side outside plate 21, the intermediate coupling member 50 has such stiffness in the vertical direction as to not deform by the load applied from the roof bodyshell 30. In contrast, the stiffness in the railcar longitudinal direction is not so required and is rather set to be low such that the intermediate coupling member 50 can deform quickly in the railcar longitudinal direction. Further, the stiffness of the intermediate coupling member 50 in the railcar longitudinal direction is lower than the stiffness thereof in the railcar width direction. The stiffness of the intermediate coupling member 50 in the railcar width direction needs to be high such that the intermediate coupling member 50 can withstand the load applied to a side surface of the intermediate coupling member 50.

Figure 5:
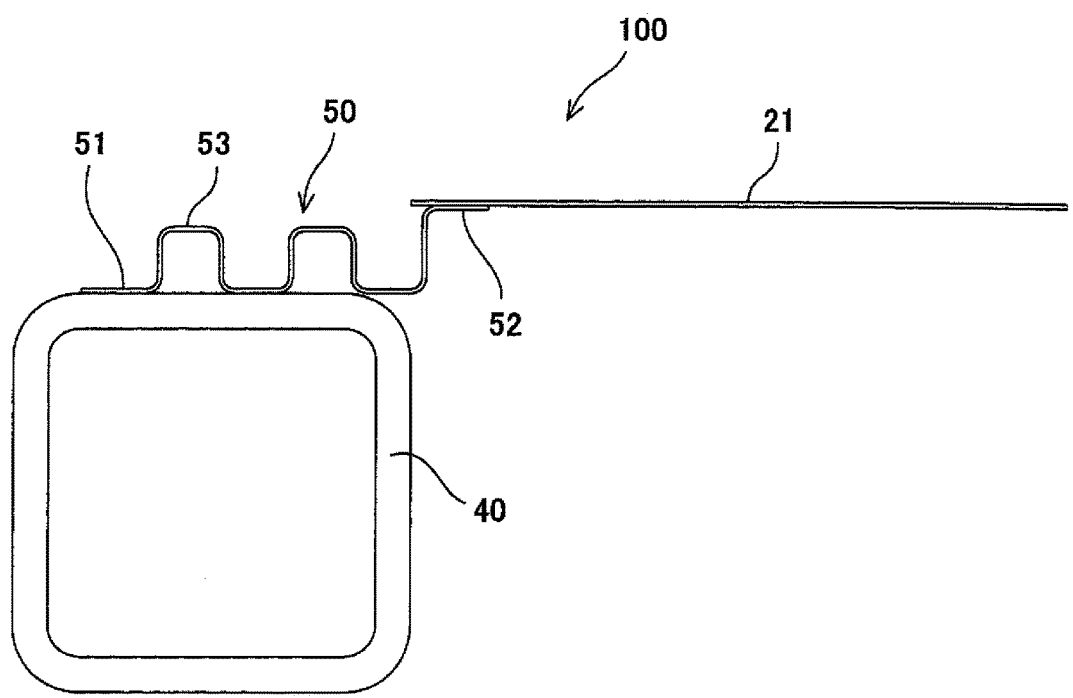
FIG. 5 is a horizontal cross-sectional view of the vicinity of the corner post shown in FIG. 1.

Here, FIG. 5 is a horizontal cross-sectional view of the vicinity of the corner post 40 of the railcar 100 according to the present embodiment. A left side in FIG. 5 corresponds to a front side of the railcar 100, an upper side in FIG. 5 corresponds to a railcar-width-direction outer side, and a lower side in FIG. 5 corresponds to a railcar-width-direction inner side (passenger room side) (the same is true in FIG. 6 and subsequent drawings). As shown in FIG. 5, in the present embodiment, the intermediate coupling member 50 is located on a railcar-width-direction inner side of the side outside plate 21, and the corner post 40 is located on a railcar-width-direction inner side of the intermediate coupling member 50. The railcar-longitudinal-direction positions of the corner post 40 and the intermediate coupling member 50 substantially coincide with each other. To be specific, the intermediate coupling member 50 is located immediately adjacent to the corner post 40. The railcar-longitudinal-direction position of a rear end of the corner post 40 and the railcar-longitudinal-direction position of a front end of the side outside plate 21 substantially coincide with each other.

The corner post fixing portion 51 is fixed to a front portion of a railcar-width-direction outer side surface of the corner post 40. The side outside plate fixing portion 52 is fixed to a front portion of a railcar-width-direction inner side surface of the side outside plate 21. As shown in FIG. 5, not only the corner post fixing portion 51 but also the contracting portion 53 contact the corner post 40, but the contracting portion 53 and the corner post 40 are not fixed to each other. The fixing of the intermediate coupling member 50 and the corner post 40 and the fixing of the intermediate coupling member 50 and the side outside plate 21 may be performed by welding, such as resistance spot welding, FSW, laser welding, or arc welding, or mechanical fastening, such as bolt fastening or rivet fastening, at fixing points 51$a$ or fixing points 51$b$ shown in, for example, FIG. 2.

Figure 6:
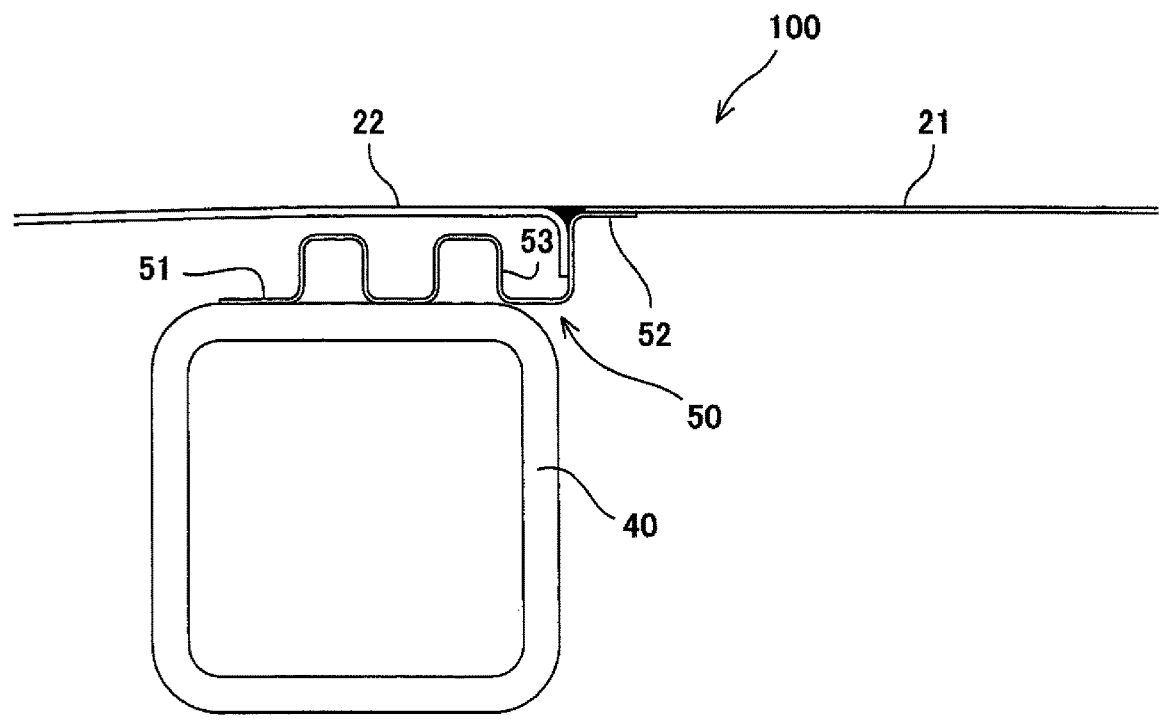
FIG. 6 is a diagram in which a lead mask is added to FIG. 5.

For ease of understanding of the configuration of the railcar 100, the foregoing has explained minimal components. However, in fact, as shown in FIG. 6 as an example, it is desirable that a lead mask 22 be attached so as to cover the intermediate coupling member 50. The lead mask 22 can be made of FRP or stainless steel, but the material thereof is not especially limited. By attaching the lead mask 22 to the railcar 100, the intermediate coupling member 50 cannot be seen from outside. Therefore, the appearance is not spoiled, and air resistance during traveling can be reduced. The stiffness of the lead mask 22 is much lower than that of the corner post 40. To be specific, a phenomenon does not occur, in which the impact load generated by the crash is transmitted via the lead mask 22 to the side outside plate 21, and this deforms the side outside plate 21.

The following will explain the deformation of respective members of the railcar 100 in a case where the railcar 100 crashes with an obstacle or the other railcar. In the following explanation, a case where a high load is applied to a vertical-direction middle portion of the corner post 40 from the front by the crash of the railcar 100 is used as an example. As shown in FIGS. 1 and 6, in the present embodiment, the corner post 40 is not located at a foremost end of the railcar 100. However, if the railcar 100 crashes with the obstacle or the like, the lead mask 22 and the like located in front of the corner post 40 cannot withstand the impact load, and the corner post 40 practically receives the impact load generated by the crash. As described above, the corner post 40 of the present embodiment is configured to deform by a certain load or higher so as to absorb the impact load. Therefore, if the high load is applied to the vertical-direction middle portion of the corner post 40 from the front, the vertical-direction middle portion is displaced backward. However, the upper end portion and lower end portion of the corner post 40 receive the impact load little, and the amounts of displacement thereof are small. To be specific, the corner post 40 deforms so as to bend around the vertical-direction middle portion.

If the corner post 40 deforms as above, the intermediate coupling member 50 crushes in the railcar longitudinal direction. Here, each of the corner post fixing portion 51, the contracting portion 53, and the side outside plate fixing portion 52 of the intermediate coupling member 50 will be explained. First, when the corner post 40 bends, the corner post fixing portion 51 also bends around its vertical-direction middle portion in the same manner as the corner post 40. To be specific, the vertical-direction middle portion of the corner post fixing portion 51 is displaced backward. Next, by the deformation of the corner post fixing portion 51, the vertical-direction middle portion of the contracting portion 53 crushes. To be specific, regarding the vertical-direction middle portion of the contracting portion 53, a portion close to the corner post fixing portion 51 is significantly displaced backward, but a portion close to the side outside plate fixing portion 52 is displaced little. Regarding each of the upper end portion and lower end portion of the contracting portion 53, both a portion close to the corner post fixing portion 51 and a portion close to the side outside plate fixing portion 52 are displaced little. The contracting portion 53 crushes as above, but the side outside plate fixing portion 52 is displaced (deforms) little. This is because although the side outside plate fixing portion 52 is a part of the intermediate coupling member 50, the side outside plate fixing portion 52 is located at a rear portion of the contracting portion 53. As a result, the side outside plate 21 fixed to the side outside plate fixing portion 52 deforms little.

As above, according to the present embodiment, if the railcar 100 crashes, the intermediate coupling member 50 crushes in the railcar longitudinal direction by the impact load transmitted through the corner post 40. With this, the deformation of the side outside plate 21 by the impact load can be suppressed. As a result, the space of the passenger room of the railcar 100 is secured, and the repair work of the railcar 100 after the crash can be prevented from becoming extensive. Further, in a case where the intermediate coupling member 50 is arranged immediately adjacent to the corner post 40 as in the present embodiment, it becomes unnecessary to secure the installation position of the intermediate coupling member 50, and the size of the lead mask 22 can be comparatively reduced.

To suppress the deformation of the side outside plate 21, the amount of displacement of the side outside plate fixing portion 52 located at the rear portion of the intermediate coupling member 50 needs to be suppressed. However, in a case where the intermediate coupling member 50 is configured to absorb the crash load when it crushes, the crash load absorbed by the corner post 40 can be reduced, which is effective. For example, in a case where the intermediate coupling member 50 is configured so as not to be displaced by the high load, such as a case where the stiffness of the intermediate coupling member 50 in the railcar longitudinal direction is increased and the side outside plate fixing portion 52 is fixed to the frame, the intermediate coupling member 50 can absorb the impact load. As above, the intermediate coupling member 50 may be configured to absorb at least a force acting in the railcar longitudinal direction in the impact load. In any case, since the intermediate coupling member 50 crushes in the railcar longitudinal direction by the impact load transmitted via the corner post 40, the intermediate coupling member 50 can reduce the impact load transmitted to the side outside plate 21 and the roof bodyshell 30.

Embodiment 2

Figure 7:
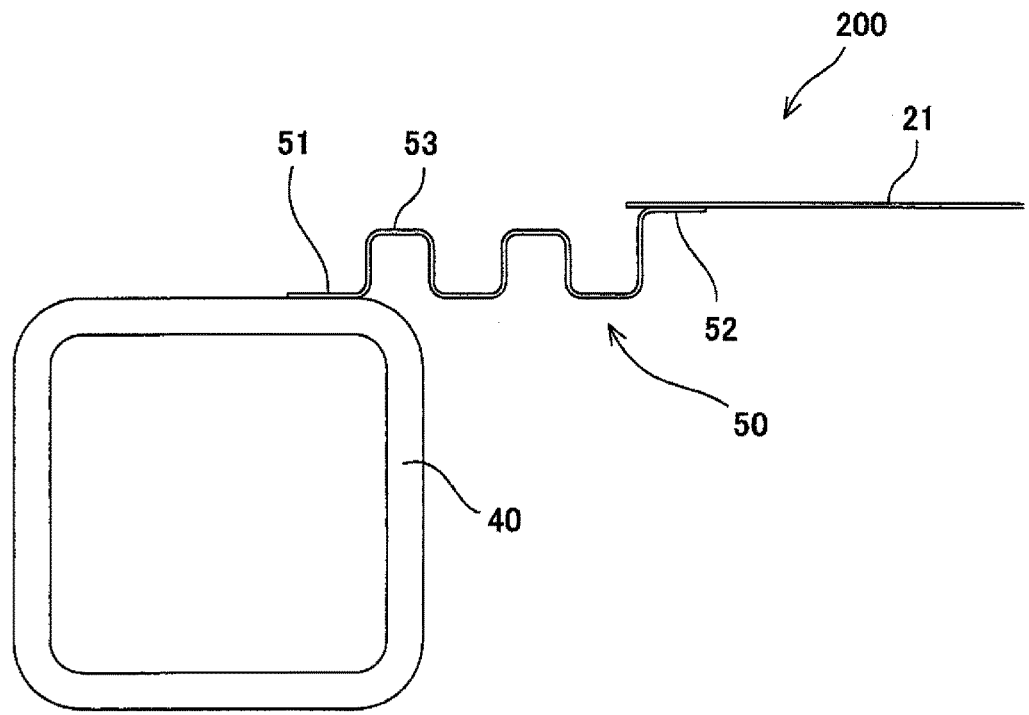
FIG. 7 is a horizontal cross-sectional view of the vicinity of the corner post of the railcar according to Embodiment 2 of the present invention.

Next, a railcar 200 according to Embodiment 2 of the present invention will be explained in reference to FIG. 7. FIG. 7 is a horizontal cross-sectional view of the vicinity of the corner post 40 of the railcar 200 according to Embodiment 2. The railcar 200 according to the present embodiment is different in configuration from the railcar 100 according to Embodiment 1 regarding the position of the intermediate coupling member 50. The other components are basically the same. As shown in FIG. 7, the positional relation among the corner post 40, the intermediate coupling member 50, and the side outside plate 21 in the railcar width direction according to the present embodiment is the same as that according to Embodiment 1. However, regarding the railcar-longitudinal-direction positions, unlike Embodiment 1, the intermediate coupling member 50 is not located immediately adjacent to the corner post 40. The intermediate coupling member 50 is located behind the corner post 40. A tip end portion of the side outside plate 21 is located behind a rear end portion of the corner post 40. The railcar 200 according to the present embodiment includes the above configuration. However, as with Embodiment 1, even if the corner post 40 deforms by the crash of the railcar 200, the side outside plate 21 can be prevented from deforming.

Embodiment 3

Figure 8:
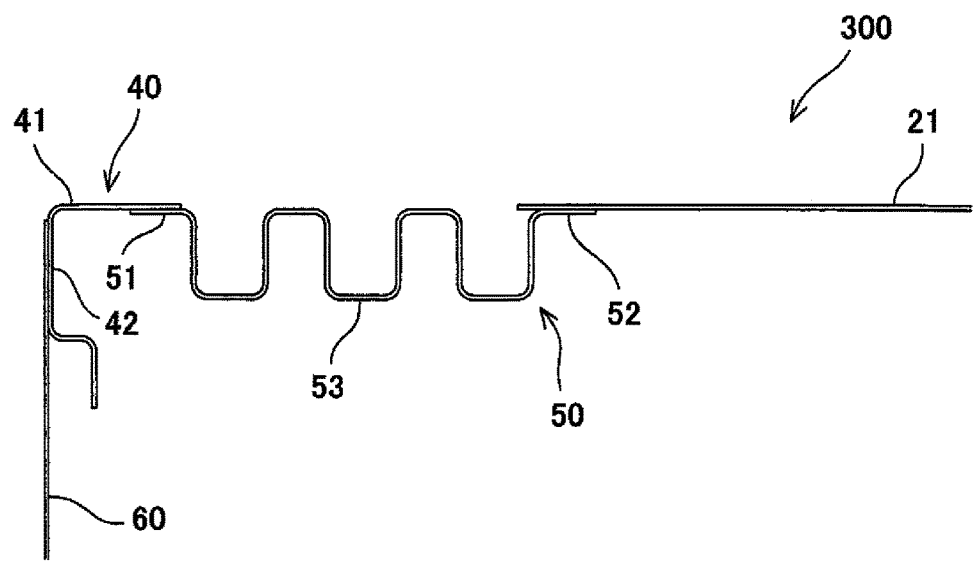
FIG. 8 is a horizontal cross-sectional view of the vicinity of the corner post of the railcar according to Embodiment 3 of the present invention.

Next, a railcar 300 according to Embodiment 3 of the present invention will be explained in reference to FIGS. 8 and 9. FIG. 8 is a horizontal cross-sectional view of the vicinity of the corner post 40 of the railcar 300 according to Embodiment 3. The railcar 300 according to the present embodiment is different in configuration from the railcar 100 according to Embodiment 1 regarding the shape of the corner post 40 and the positional relation among the corner post 40 and the members around the corner post 40. The other components are basically the same. The corner post 40 of the present embodiment is not formed to have a rectangular frame-shaped cross section but is formed in a shape that opens backward. The corner post 40 is mainly constituted by a side surface portion 41 and a front surface portion 42 connected to the side surface portion 41. The side surface portion 41 is a portion located on a railcar-width-direction outer side of the corner post 40 and extending in the railcar longitudinal direction. The front surface portion 42 is a portion located on a front side of the corner post 40 and is formed in a substantially S shape in a cross-sectional view.

The corner post 40 of the present embodiment is located at a railcar-longitudinal-direction front end of the railcar 300 and at a railcar-width-direction outer end of the railcar 300. The intermediate coupling member 50 is located behind the corner post 40, and the side outside plate 21 is located behind the intermediate coupling member 50. The railcar-width-direction positions of the corner post 40 and the intermediate coupling member 50 substantially coincide with each other. Further, the side surface portion 41 of the corner post 40 and the side outside plate 21 are flush with each other. To be specific, the corner posts 40 are respectively arranged at both railcar-width-direction end portions and are respectively flush with the outer surfaces of the side outside plates 21. The corner post fixing portion 51 (one end) of the intermediate coupling member 50 is fixed to a railcar-width-direction inner side surface of the side surface portion 41 of the corner post 40. The side outside plate fixing portion 52 (the other end) of the intermediate coupling member 50 is fixed to the railcar-width-direction inner side surface of the side outside plate 21. An end outside plate 60 is fixed to the front surface portion 42 of the corner post 40.

Figure 9:
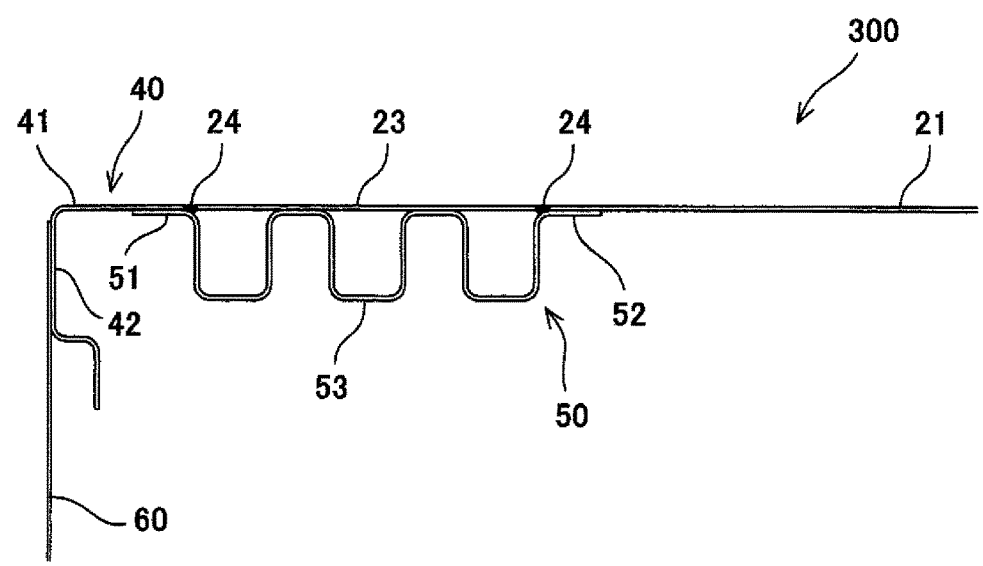
FIG. 9 is a diagram in which a blind outside plate is added to FIG. 8.

In the present embodiment, as shown in FIG. 9, the intermediate coupling member 50 cannot be seen from outside by arranging a blind outside plate 23 between the corner post 40 and the side outside plate 21. The blind outside plate 23 is fixed to the intermediate coupling member 50. Here, the blind outside plate 23 and the intermediate coupling member 50 are fixed to each other at two positions that are those middle portions contacting each other. The blind outside plate 23 and the side outside plate 21 are not directly fixed to each other, and the blind outside plate 23 and the corner post 40 are not directly fixed to each other. Sealing portions 24 are respectively formed in a portion (gap) between the blind outside plate 23 and the side outside plate 21 and a portion (gap) between the blind outside plate 23 and the corner post 40 by filling the gaps with a seal material. The reason why the blind outside plate 23 is not fixed to the corner post 40 and the side outside plate 21 is because when the railcar 300 crashes, the blind outside plate 23 is detached toward the outer side in the railcar width direction, and therefore, the impact load applied from the corner post 40 is not transmitted to the side outside plate 21. Instead of this or in addition to this, the stiffness of the blind outside plate 23 may be set to be low such that the blind outside plate 23 deforms before the side outside plate 21 deforms.

Embodiment 4

Figure 10:
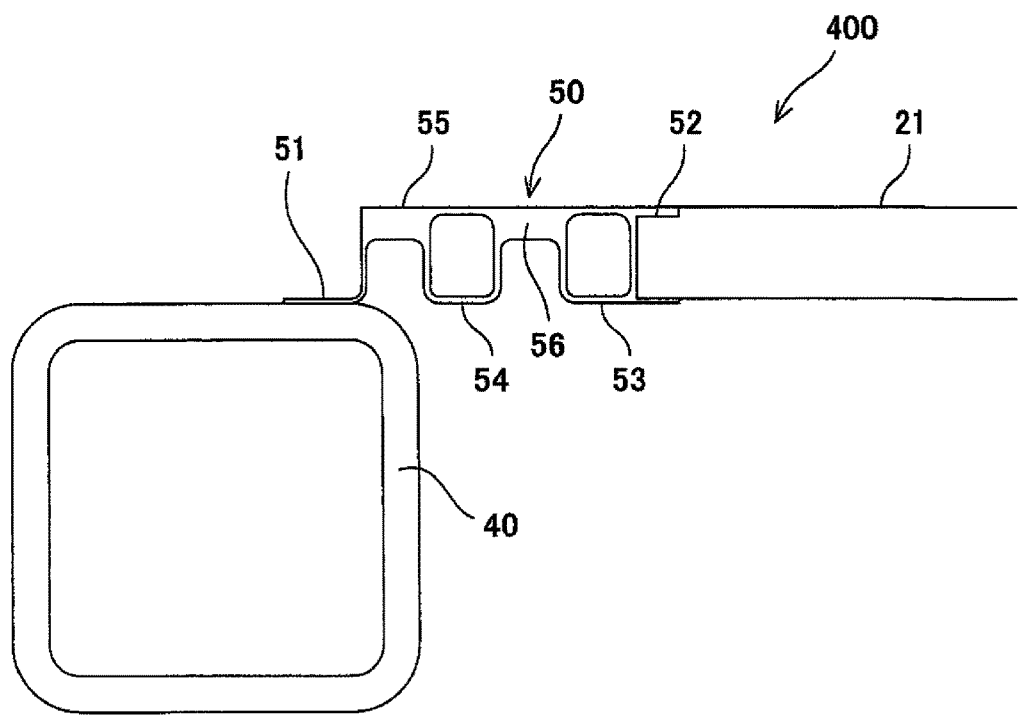
FIG. 10 is a horizontal cross-sectional view of the vicinity of the corner post of the railcar according to Embodiment 4 of the present invention.

Next, a railcar 400 according to Embodiment 4 of the present invention will be explained in reference to FIG. 10. FIG. 10 is a horizontal cross-sectional view of the vicinity of the corner post 40 of the railcar 400 according to Embodiment 4. The railcar 400 according to the present embodiment is different in configuration from the railcar 100 according to Embodiment 1 regarding the shape of the intermediate coupling member 50. Here, the side outside plate 21 of the present embodiment is a so-called aluminum double skin panel formed by extrusion molding. Therefore, as shown in FIG. 10, the side outside plate 21 has a certain thickness in the railcar width direction. The side outside plate 21 is arranged such that the direction of extrusion at the time of the extrusion molding coincides with the railcar longitudinal direction.

The intermediate coupling member 50 is also the double skin panel and includes an inner surface plate portion 54 located on a railcar-width-direction inner side, an outer surface plate portion 55 located on a railcar-width-direction outer side, and a web portion 56 configured to couple these inner and outer surface plate portions. The intermediate coupling member 50 is arranged such that the direction of extrusion coincides with the vertical direction (direction perpendicular to the sheet of FIG. 10). To be specific, the intermediate coupling member 50 is arranged in such a direction that the web portion 56 extends in the vertical direction. As above, in a case where the intermediate coupling member 50 is the skin panel and is arranged in such a direction that the web portion 56 extends in the vertical direction, a hollow portion between the adjacent web portions 56 extends in the vertical direction. With this, the stiffness of the intermediate coupling member 50 in the railcar longitudinal direction can be made lower than the stiffness thereof in the vertical direction.

Here, as is clear from the comparison between FIGS. 7 and 10, the inner surface plate portion 54 of the present embodiment corresponds to the intermediate coupling member 50 of Embodiment 2. To be specific, the intermediate coupling member 50 of the present embodiment has a shape formed by attaching the outer surface plate portion 55 having a flat plate shape to the intermediate coupling member 50 of Embodiment 2. In the intermediate coupling member 50 of the present embodiment, grooves are not formed on a railcar-width-direction outer side, but grooves extending in the vertical direction are formed on a railcar-width-direction inner side. In a case where the groove extending in the vertical direction is formed on at least one side as above, the stiffness of the intermediate coupling member 50 in the railcar longitudinal direction can be made lower than the stiffness thereof in the vertical direction.

As above, in the intermediate coupling member 50 of the present embodiment, the web portion 56 is the skin panel extending in the vertical direction, and in addition, the grooves extending in the vertical direction are formed. Therefore, the stiffness of the intermediate coupling member 50 in the railcar longitudinal direction can be further reduced. In the present embodiment, the inner surface plate portion 54 is formed in a corrugated plate shape but may be formed in a flat shape. Even in this case, the intermediate coupling member 50 is the skin panel, and the hollow portion extending in the vertical direction is formed between the inner surface plate portion 54 and the outer surface plate portion 55. Therefore, the stiffness of the intermediate coupling member 50 in the railcar longitudinal direction can be made lower than the stiffness thereof in the vertical direction.

Embodiment 5

Figure 11:
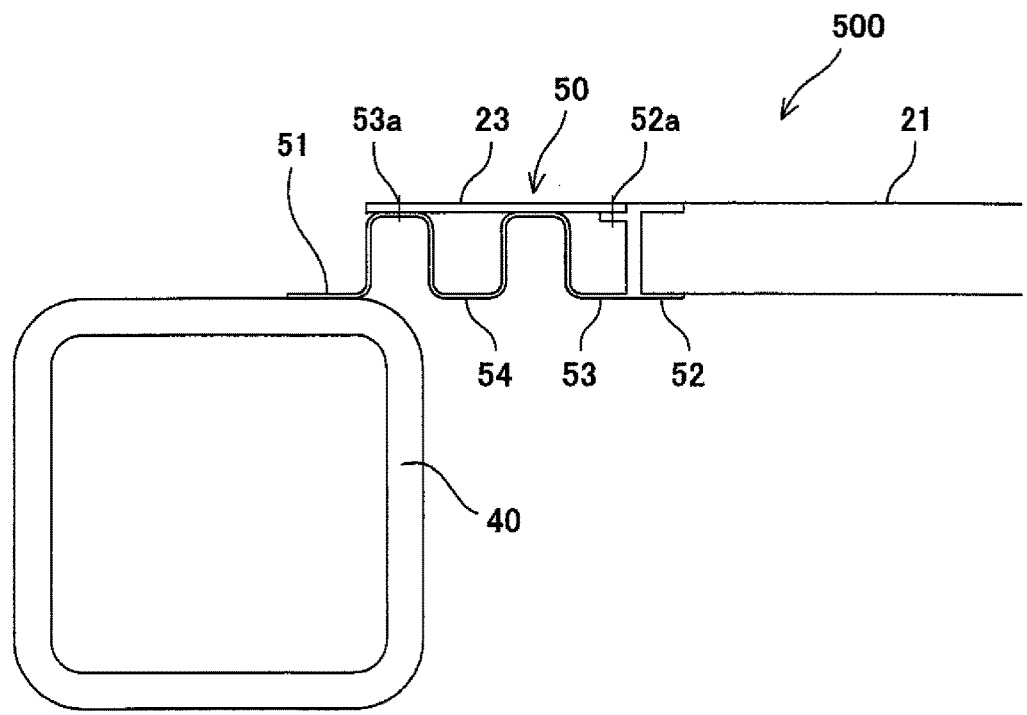
FIG. 11 is a horizontal cross-sectional view of the vicinity of the corner post of the railcar according to Embodiment 5 of the present invention.

Next, a railcar 500 according to Embodiment 5 of the present invention will be explained in reference to FIG. 11. FIG. 11 is a horizontal cross-sectional view of the vicinity of the corner post 40 of the railcar 500 according to Embodiment 5. The railcar 500 according to the present embodiment is different in configuration from the railcar 400 according to Embodiment 4 in that the intermediate coupling member 50 does not include the outer surface plate portion 55 (see FIG. 10), but instead, the blind outside plate 23 is attached to the intermediate coupling member 50. The other components are basically the same. To be specific, the intermediate coupling member 50 of the present embodiment is formed by the extrusion molding, but the contracting portion 53 is constituted only by the inner surface plate portion 54. The blind outside plate 23 is attached to a railcar-width-direction outer side of the inner surface plate portion 54. The blind outside plate 23 is fixed to the intermediate coupling member 50 at the fixing points 53a and 52a by bolts, rivets, or the like.

Embodiment 6

Figure 12:
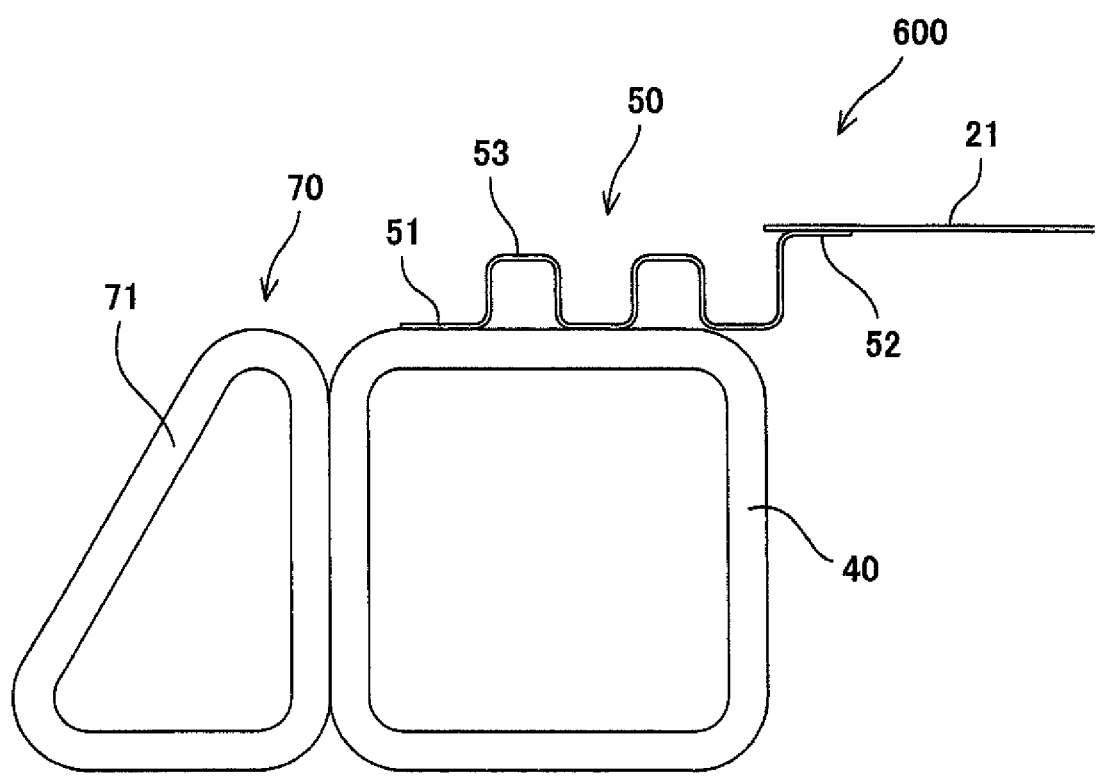
FIG. 12 is a horizontal cross-sectional view of the vicinity of the corner post of the railcar according to Embodiment 6 of the present invention.

Next, a railcar 600 according to Embodiment 6 of the present invention will be explained in reference to FIG. 12. FIG. 12 is a horizontal cross-sectional view of the vicinity of the corner post 40 of the railcar 600 according to Embodiment 6. The railcar 600 according to the present embodiment is different in configuration from the railcar 100 according to Embodiment 1 in that a guide member 70 is included. The other components are basically the same. The guide member 70 is arranged in front of the corner post 40 and is formed in a tubular shape having a substantially triangular cross section. The guide member 70 includes an inclined surface portion 71 at a railcar-width-direction end portion thereof. The inclined surface portion 71 is inclined backward in the railcar longitudinal direction toward the side outside plate 21.

The railcar 600 according to the present embodiment includes the guide member 70. Therefore, for example, in a case where the offset collision of the railcars 600 occurs, and the guide members 70 of the railcars 600 contact each other, forces are applied to the railcars 600 such that the railcars 600 are separated from each other in the railcar width direction. Thus, the proceeding direction of at least one of the railcars 600 changes. As a result, the impact load applied to the railcar 600 can be reduced. As above, the railcar 600 according to the present embodiment can travel more safely by adopting both the intermediate coupling member 50 and the guide member 70.

The foregoing has explained the embodiments of the present invention. As above, the above-described railcar is a railcar including: an underframe including an end beam at a railcar-longitudinal-direction end portion thereof; side bodyshells; a roof bodyshell; side outside plates respectively arranged at both railcar-width-direction end portions of the railcar and constituting the side bodyshells; corner posts extending from the end beam toward the roof bodyshell; and intermediate coupling members each configured to couple the side outside plate and the corner post, stiffness of the intermediate coupling member in a railcar longitudinal direction being lower than stiffness of the intermediate coupling member in a vertical direction. Therefore, even if the railcar crashes, and the corner post deforms, the intermediate coupling member located between the side outside plate and the corner post deforms to absorb the amount of displacement of the corner post. Thus, the deformation of the side outside plate can be suppressed.

The above-described railcar is configured such that the stiffness of each of the intermediate coupling members in the railcar longitudinal direction is lower than stiffness of the intermediate coupling member in a railcar width direction. With this, even if a certain load in the railcar width direction is applied to the intermediate coupling member, the intermediate coupling member can withstand it.

In the above-described railcar, the intermediate coupling members crush in the railcar longitudinal direction by an impact load, transmitted via the corner posts, to suppress deformation of the side outside plates by the impact load. Since the intermediate coupling members crush in the railcar longitudinal direction, the deformations of the side outside plates by the impact load can be surely suppressed.

In the above-described railcar, the intermediate coupling members may be configured to crush in the railcar longitudinal direction by an impact load, transmitted via the corner posts, to absorb at least a railcar-longitudinal-direction force of the impact load. With this, the crash load absorbed by the corner posts can be reduced.

In the above-described railcar, the intermediate coupling members crush in the railcar longitudinal direction by an impact load, transmitted via the corner posts, to reduce the impact load transmitted to the side outside plates and the roof bodyshell. With this, the deformations of the side outside plates and the roof bodyshell can be suppressed.

In the above-described railcar, grooves each extending in the vertical direction are formed on the intermediate coupling members. By forming the grooves, the stiffness of each of the intermediate coupling members in the railcar longitudinal direction can be made lower than the stiffness thereof in the vertical direction.

In the railcar according to Embodiment 1, each of the corner posts is arranged on a railcar-width-direction inner side of the corresponding side outside plate, and each of the intermediate coupling members includes one end fixed to a railcar-width-direction outer surface of the corresponding corner post and the other end fixed to a railcar-width-direction inner side surface of the corresponding side outside plate. With this, a space for arranging the intermediate coupling member can be suppressed to minimum.

In the railcar according to Embodiment 3, the corner posts are respectively arranged at both railcar-width-direction end portions of the railcar and are respectively flush with outer side surfaces of the side outside plates, and each of the intermediate coupling members includes one end fixed to a railcar-width-direction inner side surface of the corresponding corner post and the other end fixed to a railcar-width-direction inner side surface of the corresponding side outside plate. This configuration may be desirable depending on the shape and position of the corner post.

In the railcar according to Embodiment 4, each of the intermediate coupling members is a double skin panel including two surface plate portions and a web portion configured to couple these surface plate portions and extending in the vertical direction. In a case where the railcar has a double skin panel structure, the intermediate coupling members are also the double skin panels and are arranged in such a direction that the web portions extend in the vertical direction. With this, the stiffness of each of the intermediate coupling members in the railcar longitudinal direction can be made lower than the stiffness thereof in the vertical direction.

The railcar according to Embodiment 6 further includes guide members respectively arranged on railcar-longitudinal-direction outer sides of the corner posts and each inclined backward in the railcar longitudinal direction toward the corresponding side outside plate at the corresponding railcar-width-direction end portion. With this, for example, if the railcars crash with each other, the impact load can be reduced, so that the interior space of the railcar can be more surely secured.

The foregoing has explained the embodiments of the present invention in reference to the drawings. However, the specific configuration is not limited to these embodiments, and design modifications and the like may be made within the scope of the present invention.

INDUSTRIAL APPLICABILITY

According to the present invention, even if the corner post deforms by crash, the deformation of the side outside plate can be suppressed. Therefore, the present invention is useful in a technical field of railcars.

REFERENCE SIGNS LIST 10 underframe
11 end beam
20 side bodyshell
21 side outside plate
30 roof bodyshell
40 corner post
50 intermediate coupling member
54 inner surface plate portion
55 outer surface plate portion
56 web portion
70 guide member
100, 200, 300, 400, 500, 600 railcar

The invention claimed is:

1. A railcar comprising:
an underframe including an end beam at a railcar-longitudinal-direction end portion thereof;
side bodyshells comprising side outside plates that are respectively arranged at both railcar-width-direction end portions of the railcar;
corner posts extending from the end beam toward a roof bodyshell; and
intermediate coupling members each configured to couple one of the side outside plates and a surface of one of the corner posts that extends along a railcar longitudinal direction, stiffness of the intermediate coupling member in the railcar longitudinal direction being lower than stiffness of the intermediate coupling member in a vertical direction, wherein:
each of the intermediate coupling members is an extruded, double skin panel including, in a horizontal cross-sectional view, a straight outer surface plate portion, a corrugated inner surface plate portion, and a web configured to couple these surface plate portions and extending in the vertical direction, and
a direction of extrusion of the intermediate coupling members is in the vertical direction.

2. The railcar according to claim 1, wherein the stiffness of each of the intermediate coupling members in the railcar longitudinal direction is lower than stiffness of the intermediate coupling member in a railcar width direction.

3. The railcar according to claim 1, wherein the intermediate coupling members are configured to crush in the railcar longitudinal direction to suppress deformation of the side outside plates by an impact load transmitted via the corner posts.

4. The railcar according to claim 1, wherein the intermediate coupling members are configured to crush in the railcar longitudinal direction to absorb at least a railcar-longitudinal-direction force of an impact load transmitted via the corner posts.

5. The railcar according to claim 1, wherein the intermediate coupling members are configured to crush in the railcar longitudinal direction to reduce an impact load transmitted via the corner posts to the side outside plates and the roof bodyshell.

6. The railcar according to claim 1, wherein grooves each extending in the vertical direction are formed on the intermediate coupling members.

7. A railcar comprising:
an underframe including an end beam at a railcar-longitudinal-direction end portion thereof;
side bodyshells comprising side outside plates that are respectively arranged at both railcar-width-direction end portions of the railcar;
corner posts extending from the end beam toward a roof bodyshell; and
intermediate coupling members each configured to couple one of the side outside plates and a surface of one of the corner posts that extends along a railcar longitudinal direction, stiffness of the intermediate coupling member in the railcar longitudinal direction being lower than stiffness of the intermediate coupling member in a vertical direction, wherein:
each of the corner posts is arranged at a railcar-width-direction inner side of the corresponding side outside plate; and
each of the intermediate coupling members includes (i) one end fixed to the railcar-longitudinal-direction-extending surface of the corresponding corner post, which is an outer side surface of the corner post in the railcar-width-direction, and (ii) another end fixed to a railcar-width-direction inner side surface of the corresponding side outside plate.

8. A railcar comprising:
an underframe including an end beam at a railcar-longitudinal-direction end portion thereof;
side bodyshells comprising side outside plates that are respectively arranged at both railcar-width-direction end portions of the railcar;
corner posts extending from the end beam toward a roof bodyshell; and
intermediate coupling members each configured to couple one of the side outside plates and a surface of one of the corner posts that extends along a railcar longitudinal direction, stiffness of the intermediate coupling member in the railcar longitudinal direction being lower than stiffness of the intermediate coupling member in a vertical direction, wherein:
the corner posts are respectively arranged at both railcar-width-direction end portions of the railcar and are respectively flush with outer side surfaces of the side outside plates; and
each of the intermediate coupling members includes (i) one end fixed to the railcar-longitudinal-direction-extending surface of the corresponding corner post, which is an inner side surface of the corner post in the railcar-width-direction, and (ii) another end fixed to a railcar-width-direction inner side surface of the corresponding side outside plate.

9. The railcar according to claim 1, further comprising guide members respectively arranged on railcar-width-direction extending outer sides of the corner posts and each inclined backward in the railcar longitudinal direction toward the corresponding side outside plate at the corresponding railcar-width-direction end portion.

10. The railcar according to claim 6, wherein the grooves are formed by concavities in the intermediate coupling members.

11. The railcar according to claim 10, wherein at least a portion of each of the intermediate coupling members has a corrugated plate shape.

12. The railcar according to claim 6, wherein the grooves are located between surfaces of the intermediate coupling members that face each other.

13. The railcar according to claim 1, wherein the intermediate coupling members are each configured to couple an end of the railcar-longitudinal-direction-extending surface of the corresponding corner post that is farthest from the corresponding side outside plate.

* * * * *